US009635374B2

(12) United States Patent
Zhou et al.

(10) Patent No.: US 9,635,374 B2
(45) Date of Patent: Apr. 25, 2017

(54) SYSTEMS AND METHODS FOR CODING VIDEO DATA USING SWITCHABLE ENCODERS AND DECODERS

(75) Inventors: Xiaosong Zhou, Campbell, CA (US); Hsi-Jung Wu, San Jose, CA (US); Chris Y. Chung, Sunnyvale, CA (US); Feng Yi, San Jose, CA (US)

(73) Assignee: APPLE INC., Cupertino, CA (US)

( * ) Notice: Subject to any disclaimer, the term of this patent is extended or adjusted under 35 U.S.C. 154(b) by 652 days.

(21) Appl. No.: 13/564,686

(22) Filed: Aug. 1, 2012

(65) Prior Publication Data

US 2013/0034151 A1 Feb. 7, 2013

Related U.S. Application Data

(60) Provisional application No. 61/513,815, filed on Aug. 1, 2011.

(51) Int. Cl.
*H04N 19/42* (2014.01)
*H04N 19/12* (2014.01)

(52) U.S. Cl.
CPC ............ *H04N 19/42* (2014.11); *H04N 19/12* (2014.11)

(58) Field of Classification Search
CPC ............................... H04N 19/42; H04N 19/12
USPC ................. 375/240.03, 240.02, E07.152
See application file for complete search history.

(56) References Cited

U.S. PATENT DOCUMENTS

| | | | |
|---|---|---|---|
| 5,596,321 A * | 1/1997 | Hekstra | H04N 7/54 341/76 |
| 5,612,900 A * | 3/1997 | Azadegan et al. | 709/247 |
| 5,812,873 A * | 9/1998 | Ryu | G11B 20/00007 341/143 |
| 7,088,269 B2 | 8/2006 | Kadono et al. | |
| 7,706,447 B2 | 4/2010 | Karczewicz et al. | |
| 8,699,569 B2 * | 4/2014 | Muraki | H04N 7/50 375/240 |
| 2001/0040700 A1 * | 11/2001 | Hannuksela et al. | 358/261.2 |
| 2005/0130645 A1 * | 6/2005 | Albert Dobson | H04L 41/00 455/423 |
| 2006/0020710 A1 * | 1/2006 | Rabenold | H04N 21/23439 709/236 |

(Continued)

FOREIGN PATENT DOCUMENTS

FR WO 2009047697 A2 * 4/2009 ............. H04N 19/61

*Primary Examiner* — Jay Patel
*Assistant Examiner* — Marnie Matt
(74) *Attorney, Agent, or Firm* — Baker Hostetler LLP; Robert L. Hails

(57) ABSTRACT

A system and method for switching between multiple encoders or decoders may be implemented to quickly and seamlessly transfer coding operations between two encoders. Before switching from a first encoder to a second encoder, the second encoder is initialized and updated with a copy of the necessary information from the first encoder. Similarly when switching from a first decoder to a second decoder, the second decoder is initialized and the necessary information from the first decoder is passed to the second decoder. A controller may monitor the system to identify a condition that would trigger an encoder switch and identify the encoder that best suits the system conditions. A shared memory unit accessible by either encoder may store the initialization information. A shared decode unit accessible by either encoder may transmit decoded frames between encoders.

33 Claims, 13 Drawing Sheets

(56) References Cited

U.S. PATENT DOCUMENTS

| | | | |
|---|---|---|---|
| 2006/0083315 A1* | 4/2006 | Sato | H04H 60/12 375/240.25 |
| 2007/0291841 A1* | 12/2007 | Muraki et al. | 375/240.12 |
| 2008/0037656 A1* | 2/2008 | Hannuksela | H04N 21/23614 375/240.26 |
| 2008/0130747 A1* | 6/2008 | Moriya | H04N 19/56 375/240.15 |
| 2008/0152014 A1* | 6/2008 | Schreier | H04N 19/172 375/240.21 |
| 2008/0267292 A1* | 10/2008 | Ito | H04N 19/52 375/240.16 |
| 2008/0282299 A1* | 11/2008 | Koat | H04L 12/14 725/93 |
| 2009/0022172 A1* | 1/2009 | Haberman | H04N 21/23424 370/429 |
| 2009/0251528 A1 | 10/2009 | Friel et al. | |
| 2010/0080328 A1 | 4/2010 | Johansson et al. | |
| 2011/0110417 A1* | 5/2011 | Tabuchi | G11B 27/034 375/240.01 |
| 2012/0033727 A1* | 2/2012 | Shor | H04N 19/172 375/240.02 |
| 2012/0179833 A1* | 7/2012 | Kenrick | H04N 21/23430 709/231 |
| 2014/0161172 A1* | 6/2014 | Wang | H04N 19/42 375/240.01 |

\* cited by examiner

100

200

500

600

700

800

900

1000

1100

1200

SYSTEMS AND METHODS FOR CODING VIDEO DATA USING SWITCHABLE ENCODERS AND DECODERS

CROSS-REFERENCE TO RELATED APPLICATIONS

The present application claims the benefit of U.S. Provisional application, Ser. No. 61/513,815, filed Aug. 1, 2011, entitled "FLEXIBLE CODEC SWITCHING", the disclosure of which is incorporated herein by reference in its entirety.

BACKGROUND

Aspects of the present invention relate generally to the field of video processing, and more specifically, to managing multiple coders for a single video stream.

In video coding systems, an encoder may code a source video sequence into a coded representation that has a smaller bit rate than does the source video and thereby achieve data compression. Using predictive coding techniques, some portions of a video stream may be coded independently (intra-coded I-frames) and some other portions may be coded with reference to other portions (inter-coded frames, e.g., P-frames or B-frames). For example, P-frames may be coded with reference to a single previously coded frame and B-frames may be coded with reference to a pair of previously coded frames. Previously coded frames, also known as reference frames, may be temporarily stored by the encoder for future use in inter-frame coding. A reference frame cache may store frame data that may represent sources of prediction for later-received frames input to the video coding system. However, due to constraints in buffer sizes, a limited number of reference frames can be stored in the buffer.

The resulting compressed data (bitstream) may be transmitted to a decoder via a channel. To recover the video data, the bitstream may be decompressed at the decoder by inverting the coding processes performed by the encoder, yielding a received decoded video sequence.

If multiple encoders are provided, each of the encoders may utilize the same coding standard (e.g., H.264) but provide different capabilities or codecs. For example, a first encoder may be fast or operate with low power, but produce only moderate quality images, whereas a second encoder may produce better quality images but require significantly more power, produce coded video slower, or utilize significantly more bandwidth to transmit coded video data.

Conventionally, switching between encoders means beginning the coding process anew with a fresh encoder and transmitting an IDR to the decoder, refreshing the decoder and clearing the reference picture cache. Then reference frames are not available and predictive coding will not immediately be available. The first frame encoded at the second encoder and transmitted to the decoder will be an I-frame and possibly used as the first reference frame for a subsequent sequence of frames. Because I-frames are coded without reference to other frames, the I-frame takes longer to create and more bandwidth to transmit. This creates a delay in transmitting newly coded video data from a second encoder and eliminates some of the benefit of predictive coding.

Conventional video coding systems often operate in processing environments in which the resources available for coding or decoding operations vary dynamically. Modern communication networks provide variable bandwidth channels that connect an encoder to a decoder. Further, processing resources available at an encoder or a decoder may be constrained by hardware limitations or power consumption objectives that limit the complexity of analytical operations that can be performed for coding or decoding operations. When sufficient resources are unavailable, video coding systems may wait until they are available in order to maintain the coding rate or quality, causing an undesirable delay. However, real-time video coding systems may not have the ability to pause coding operations until system resources are available.

Accordingly, there is a need in the art to more efficiently switch between encoders.

BRIEF DESCRIPTION OF THE DRAWINGS

The foregoing and other aspects of various embodiments of the present invention will be apparent through examination of the following detailed description thereof in conjunction with the accompanying drawing figures in which similar reference numbers are used to indicate functionally similar elements.

DETAILED DESCRIPTION

A system and method for switching between multiple encoders or decoders may be implemented to quickly and seamlessly transfer coding operations between two encoders. Before switching from a first encoder to a second encoder, the second encoder is initialized and updated with a copy of the necessary information and states (such as reference frame buffer, various frame counters, etc.) from the first encoder. Subsequent frames may then be coded without interruption at the second encoder. Similarly, when switching from a first decoder to a second decoder, the second decoder is initialized and the necessary information and states from the first decoder are passed to the second decoder.

A controller may monitor the system to identify a condition that would trigger an encoder switch and identify the encoder that best suits the system conditions. An encoder switch may be triggered by changes in encoder performance, limits on power consumption and available power, codec features available in the second encoder and not the first encoder, available bandwidth and the bandwidth required by each codec, the quality of the video being produced by the encoder, the encode frame rate, the decode power consumption on the receiver, or any other performance measure that would indicate a switch is desirable. A predetermined threshold may be defined for each performance measure such that when the threshold is crossed, the encoder switch is triggered.

Different encoders may have different capabilities, different resources, or result in a different performance. For example, hardware encoders may code video data quickly, but may have lower quality. Additionally, hardware encoders may be implemented as an application specific integrated circuit (ASIC) that may not allow parameter or coding mode adjustments. Software encoders may be comparatively slower but provide for greater quality encoding or otherwise allow for greater flexibility in adjusting the coding modes and parameters utilized in coding the video data. Additional encoders having different strengths and weaknesses may be implemented in an exemplary system. Accordingly, it may be valuable to provide for easy switching between encoders (or decoders).

A controller may facilitate the transmission of initialization information between the memory units of each encoder. According to an embodiment of the present invention, a shared memory unit may be used to store the initialization information which may be accessed by either encoder. According to an embodiment of the present invention, a shared decoder unit may be used to transmit decoded reference frames between encoders.

Figure 1:
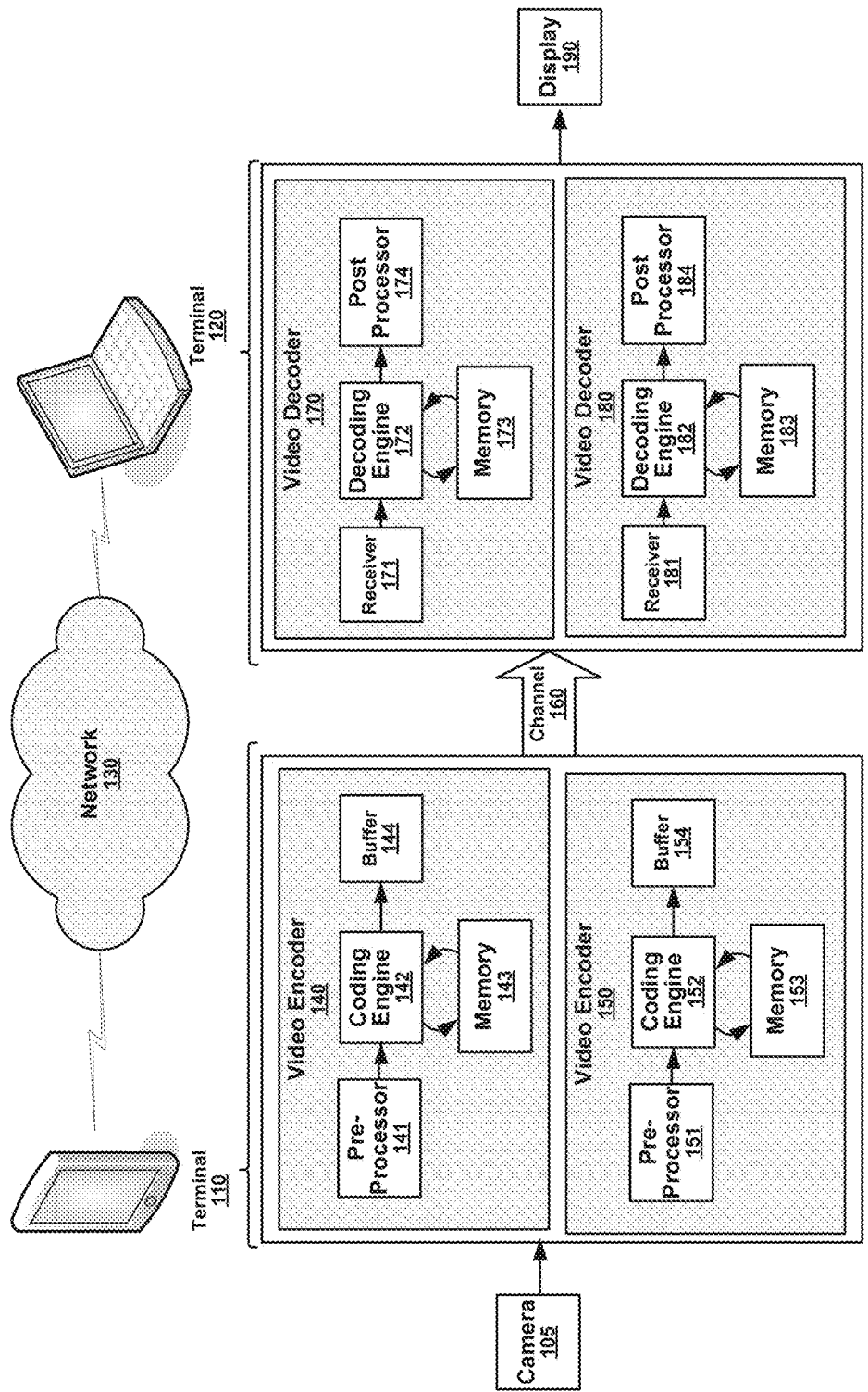
FIG. 1 is a simplified block diagram of a video communication system having a video transmitter and a video receiver.

FIG. 1 is a simplified block diagram of a video communication system 100 having a video transmitter and a video receiver. As shown in FIG. 1, a video communication system 100 may include terminals 110, 120 that may communicate via a network 130. The terminals 110, 120 each may capture video data locally and code the video data for transmission to another terminal via the network 130. Each terminal 110, 120 may receive coded video data of the other terminal from the network 130, decode the coded data and display the recovered video data. Exemplary terminals may include personal computers (both desktop and laptop computers), tablet computers, handheld computing devices, computer servers, media players and/or dedicated video conferencing equipment.

A first terminal 110 may include one or more encoders 140, 150. Each encoder 140, 150 may include a pre-processor 141, 151 that receives source video from a camera 105 and parses the source video into components for coding. The pre-processor 141, 151 may perform video processing operations on the components including filtering operations such as de-noising filtering, bilateral filtering or other kinds of processing operations that may improve efficiency of coding operations performed by the encoder 140, 150. The pre-processor 141, 151 may analyze and condition the source video for more efficient compression.

Each encoder 140, 150 may further include a coding engine 142, 152 that codes processed video according to a variety of coding modes to achieve bandwidth compression.

The coding engine 142, 152 may select from a variety of coding modes to code the video data, where each different coding mode may yield a different level of compression, depending upon the content of the source video. In some video coding systems, an encoder may code each portion of an input video (for example, each pixel block or each frame) according to multiple coding techniques and examine the results to select a preferred coding mode for the respective portion. For example, the coding engine might code the pixel block according to a variety of prediction coding techniques, decode the coded block and estimate whether distortion induced in the decoded block by the coding process would be perceptible.

Each encoder 140, 150 may further include a memory storage 143, 153 accessible by the encoders 140, 150. The memory storage 143, 153 may be used for temporarily storing encoder state information during runtime, for storing reference frames in a reference frame cache, or for storing video data as needed. Memory storage 143, 153 may be any known storage medium that can store information, for example RAM, ROM, flash memory, or any electromagnetic or optical storage device.

Each encoder 140, 150 may additionally include a coded video data buffer 144, 154 to store coded video data until it is combined into a common bit stream to be delivered by a transmission channel 160 to a decoder 170, 180 or second terminal 120. The channel 160 may be a transmission channel provided by communications or computer networks, for example either a wired or wireless network.

A second terminal 120 may include one or more decoders 170, 180. Each decoder may include a receiver 171, 181 to store the received coded data to be decoded and a decoding engine 172, 182. The decoding engine 172, 182 may parse the coded data to recover the original source video data for example by inverting coding operations performed by an encoder.

Each decoder 170, 180 may further include a post-processor 174, 184 to prepare the decompressed video by filtering, de-interlacing, scaling or performing other processing operations on the decompressed sequence that may improve the quality of the video displayed. The processed video data may then be displayed on a screen or other display 190 or may be stored in a storage device for later use.

Each decoder 170, 180 may additionally include a memory storage 173, 183 accessible by the decoders 170, 180. The memory storage may be used for temporarily storing decoder state information during runtime, for storing reference frames in a reference frame cache, or for storing video data as needed.

As shown, multiple encoders 140, 150 or decoders 170, 180 may be provided at a single terminal 110, 120. One or more of the encoders may be primarily hardware encoders implemented with a digital signal processor (DSP) or single application specific integrated circuit (ASIC) whereas a second encoder may be implemented in software with several encoding steps implemented with one or more software modules. Similarly, one or more of the decoders may be primarily hardware decoders implemented with a DSP or single ASIC, whereas a second decoder may be implemented in software with several decoding steps implemented with one or more software modules.

As shown, the video communication system 100 supports video coding and decoding in one direction only. However, according to an embodiment, bidirectional communication may be achieved with an encoder and a decoder implemented at each terminal 110, 120, such that each terminal 110, 120 may capture video data at a local location and code the video data for transmission to another terminal via the network 130. Each terminal 110, 120 may receive the coded video data of the other terminal from the network 130, decode the coded data and display video data recovered therefrom.

Each terminal 110, 120 may switch between encoders 140, 150 or decoders 170, 180 respectively, according to the demands of the video coding system 100. For example, the decision to switch from a first encoder 140 to a second encoder 150 may be based on changes in encoder performance, power consumption and available power, codec features available in the second encoder and not the first encoder, available bandwidth and the bandwidth required by each codec, the quality of the video being produced by the encoder, or any other performance measure that would indicate a switch is desirable.

Upon detecting a condition that would warrant switching encoders, the second encoder 150 may be initialized. In order for the terminal 110, 120 to continue coding the frame sequence without interruption, the second encoder 150 may code one or more throw-away frames in order to bring the encoder 150 to a state where the next frame can be a predictively coded P- or B-frame. Then the second decoder 150 may more easily receive state information passed from the first encoder 140.

Figure 2:
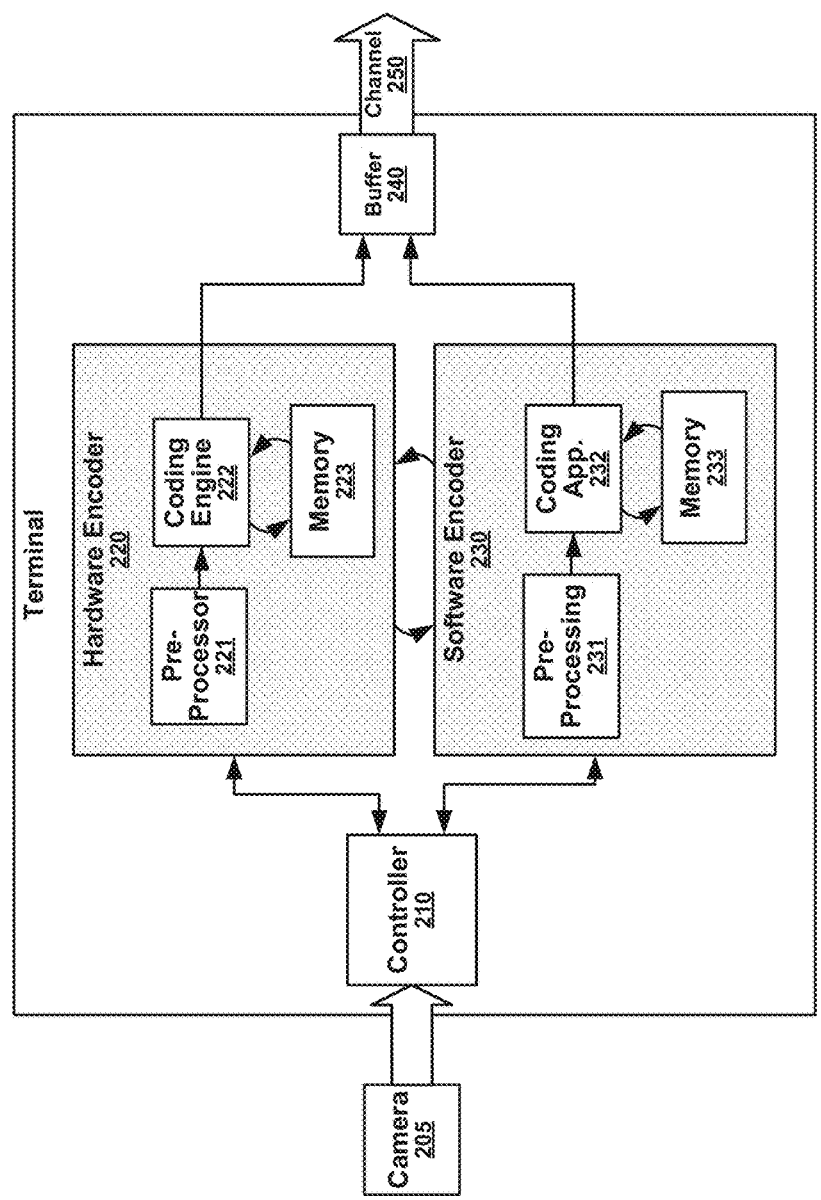
FIG. 2 is a simplified block diagram of a terminal according to an embodiment of the present invention.

FIG. 2 is a simplified block diagram of a terminal 200 according to an embodiment of the present invention. As previously noted, a transmitting terminal 200 may include multiple encoders. As shown in FIG. 2, the terminal 200 may include a hardware encoder 220 and a software encoder 230.

A hardware encoder 220 may include a pre-processor 221 that may receive source video and parses the source video into components for coding. The pre-processor 221 may perform video processing operations on video components including filtering operations that improve efficiency of coding operations performed by the encoder 220. The hardware encoder 220 may further include a coding engine 222 that may receive the video output from the pre-processor 221 and generate compressed video. The coding engine 222 may operate according to a predetermined protocol, such as H.263, H.264, MPEG-2. In its operation, the coding engine 222 may perform various compression operations, including predictive coding operations that exploit temporal and spatial redundancies in the input video sequence. The coded video data, therefore, may conform to a syntax specified by the protocol being used.

The hardware encoder 220 may additionally include a memory 223 to store the reference frame cache and to store state information and related data. State information may include reference frames, frame counters for the group of pictures (GOP) or the current sequence, the GOP structure, the rate control, the current QP, etc.

As shown in FIG. 2, a software encoder 230 may include a pre-processing module 231 that receives source video data and parses the source video into components for coding. The pre-processor module 231 may analyze and condition the source video data for more efficient compression. The software encoder may further include a coding application 232 that may generate compressed video from the video data prepared by the pre-processing module 231 in accordance with a coding mode. The software encoder 230 may additionally include or have access to a memory 233 to store reconstructed frame data and other encoder related or state information.

The terminal 200 may additionally include a controller 210 that receives input video data from the camera 205, monitors the conditions of the encoders 220, 230, and determines which encoder will process the video data. The controller may also have access to the memory storage 223, 233 of each encoder 220, 230 wherein the respective encoder may store reference frames and other state data. The controller 210 may additionally detect conditions in the terminal 200 to determine when to switch between encoders 220, 230. The decision to switch encoders may be based on changes in encoder performance, power consumption and available power, codec features available in the second encoder and not the first encoder, available bandwidth and the bandwidth required by each codec, the quality of the video being produced by the encoder, or any other performance measure that would indicate a switch is desirable.

Upon determining a switch, the controller 210 may initialize the second encoder 230. When switching encoders, the controller 210 may have access to the current state information of the first encoder 220 and transfer the information to the second encoder 230. The initialization of the second encoder 230 may occur simultaneously with the state information transfer or before the transfer, while the first encoder 220 remains the active encoder.

As shown in FIG. 2, the terminal 200 may additionally include a coded video data buffer 240 to store the coded data until it is combined into a common bit stream to be delivered by a transmission channel 250 to a decoder, terminal, or other storage.

Figure 3:
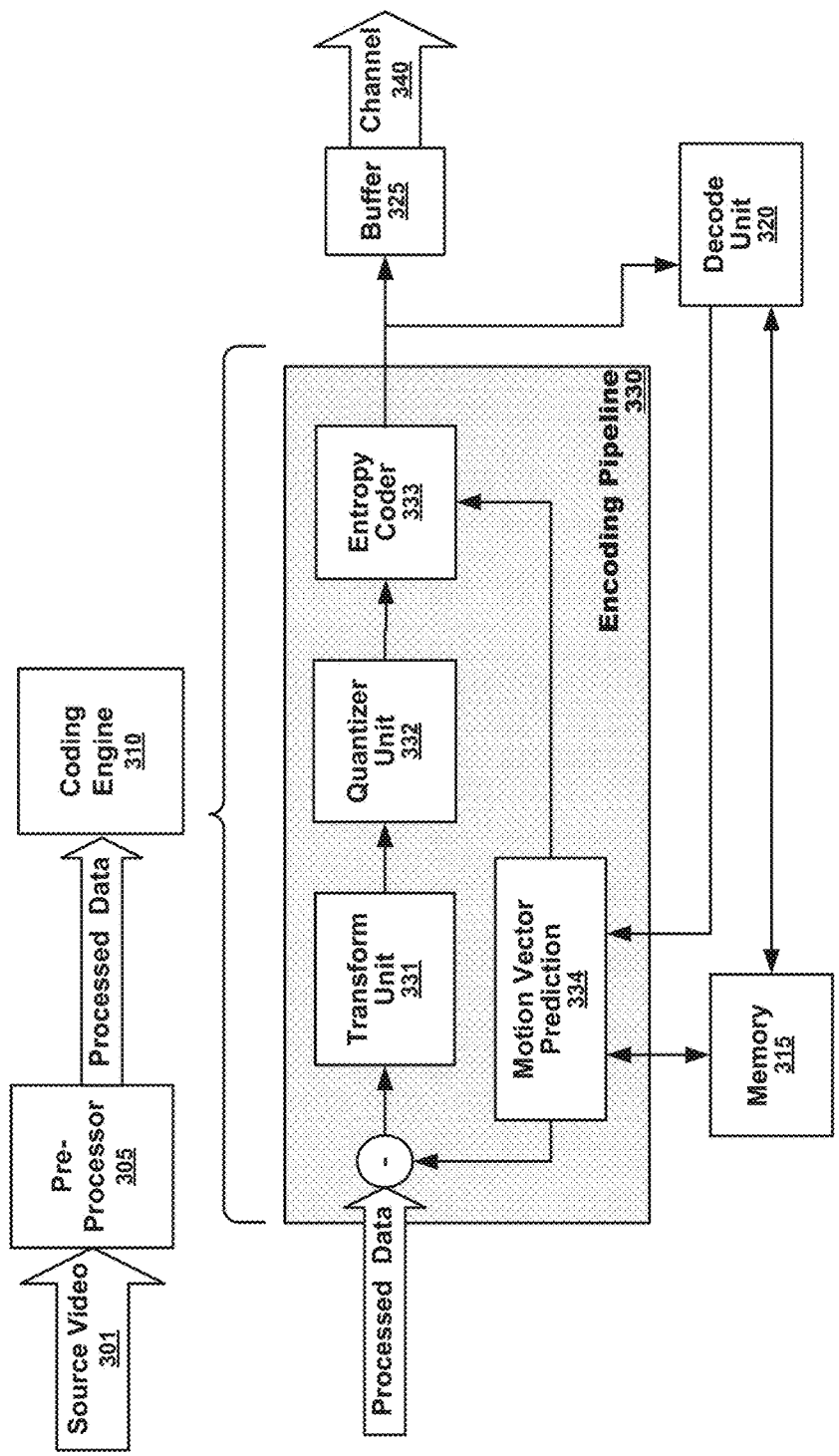
FIG. 3 is a simplified block diagram of a hardware encoder according to an embodiment of the present invention.

FIG. 3 is a simplified block diagram of a hardware encoder 300 according to an embodiment of the present invention. As shown in FIG. 3, the encoder 300 may include a pre-processor 305, a coding engine 310, a memory 315, a decode unit 320, and a coded video data buffer 325. The encoder 300 may receive an input source video 301 from a video source such as a camera or storage device. The pre-processor 305 may process the input source video 301 as a series of frames and condition the source video for more efficient compression. For example, the image content of an input source video sequence may be evaluated to determine an appropriate coding mode for each frame. The pre-processor 305 may additionally perform video processing operations on the frames, including filtering operations such as de-noising filtering, bilateral filtering or other kinds of processing operations that improve efficiency of coding operations performed by the encoder 300.

The coding engine 310 may receive the processed video data from the pre-processor 305 and generate compressed video. Reference frames used to predictively code the video data may be decoded and stored in memory 315 for future use by the coding engine 310. The coded frames or pixel blocks may then be output from the coding engine 310 and stored in the buffer 325 for transmission on the channel 340.

FIG. 3 further illustrates a simplified exemplary coding engine 310 according to an embodiment of the present invention. The coding engine 310 may operate according to a predetermined protocol, such as H.263, H.264, or MPEG-2. The coded video data output from the coding engine may therefore conform to a syntax specified by the protocol being used. The coding engine 310 may include an encoding pipeline 330, further including a transform unit 331, a quantizer unit 332, an entropy coder 333, a motion vector prediction unit 334, and a subtractor. The transform unit 331 may convert the processed data into an array of transform coefficients, for example, by a discrete cosine transform (DCT) process or wavelet process. The transform coefficients can then be sent to the quantizer unit 332 where they may be divided by a quantization parameter. The quantized data may then be sent to the entropy coder 333 where it may be coded by run-value or run-length or similar coding for compression.

The coding engine 310 may further access a decode unit 320 that decodes the coded video data output from the encoding pipeline by reversing the entropy coding, the quantization, and the transforms. Decoded frames may then be stored in memory 315 for use by the coding engine 310. The memory 315 may store frame data that represents source blocks for the skip mode and sources of prediction for later-received frames input to the encoder 300. The subtractor may compare the incoming video data to the predicted video data output from motion vector prediction unit 334, thereby generating data representative of the difference between the two data. However, non-predictively coded data may be coded without comparison to the reference pictures. The coded video data may then be output from the coding engine 310 and stored by the coded video data buffer 325 where it may be combined into a common bit stream to be delivered by the transmission channel to a decoder, terminal, or data storage.

Figure 4:
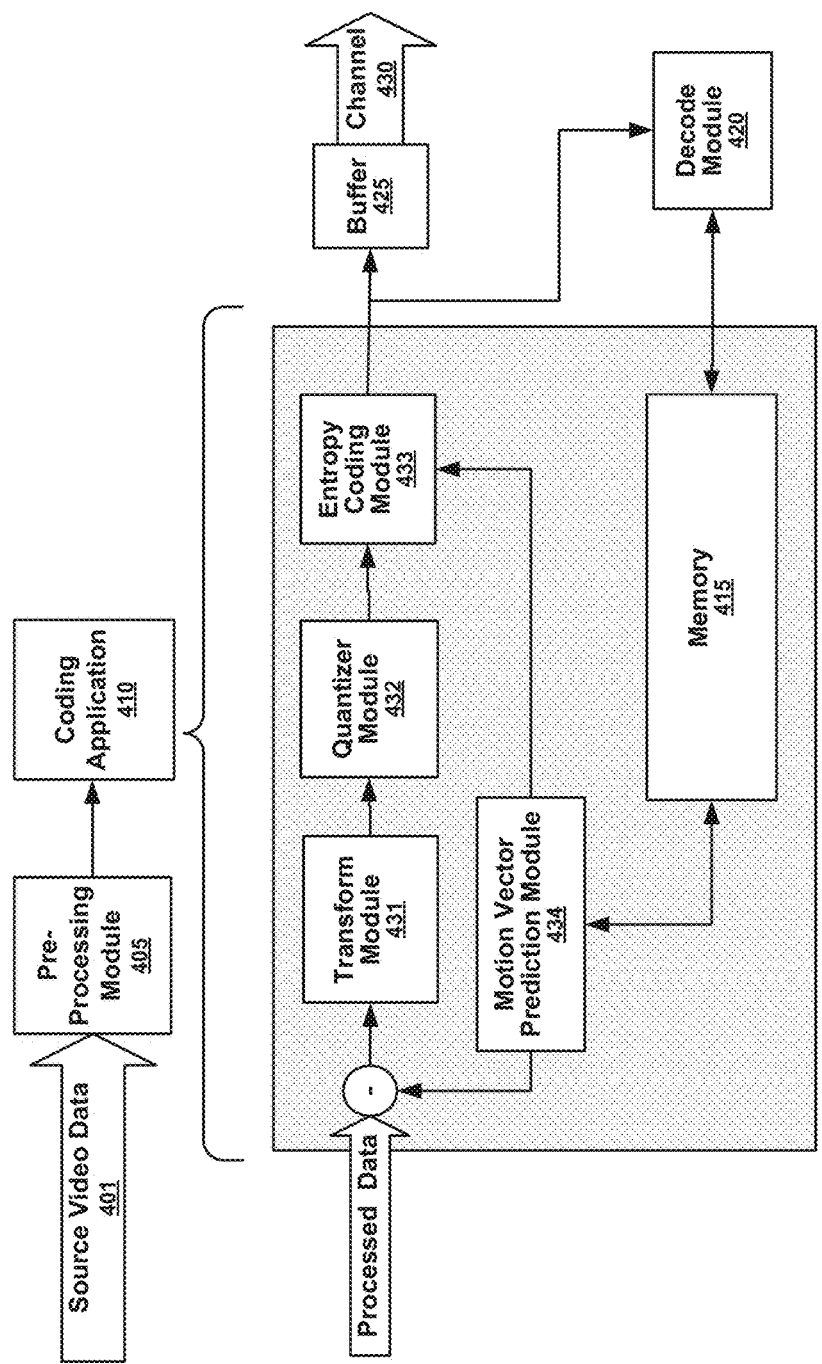
FIG. 4 is a simplified block diagram of a software encoder according to an embodiment of the present invention.

FIG. 4 is a simplified block diagram of a software encoder 400 according to an embodiment of the present invention. As shown in FIG. 4, the encoder 400 may include a pre-processing module 405, a coding application 410, a memory 415, a decode module 420, and a coded video data buffer 425. The encoder 400 may receive an input source video 401 from a video source such as a camera or storage device and the pre-processing module 405 may process the input source video 401 including performing filtering and other processing operations that improve efficiency of coding operations performed by the encoder 400.

The coding application 410 may receive the processed video data from the pre-processing module 405 and generate compressed video. Reference data used to predictively code the video data may be decoded and stored in memory 415 for future use by the coding application 410. The coding application 410 may encode video data according to a predetermined protocol, such as H.263, H.264, or MPEG-2. The coded video data output from the coding application may therefore conform to a syntax specified by the protocol being used.

The coding application 410 may include a sequence of encoding modules including a transform module 431, a quantizer module 432, an entropy coding module 433, a motion vector prediction module 434, and a subtractor module. The transform module 431 may convert the processed data into an array of transform coefficients. The quantizer module 432 may then divide the transform coefficients by a quantization parameter. The entropy coding module 433 may then code the quantized data by run-value or run-length or similar coding for compression.

The coding application 410 may further call a decode module 420 that decodes the coded video data output from the encoding modules by reversing the entropy coding, the quantization, and the transform. Decoded data may then be stored in memory 415 for future use by the coding modules. The memory 415 may store video data that represents sources of prediction for later-received video data input to the encoder 400. The subtractor module may be used to compare the incoming video data to the predicted video data output from motion vector prediction module 434, thereby generating data representative of the differences between the two data. However, non-predictively coded data may be coded without comparison to the reference pictures. The coded video data may then be output from the coding application 410 and stored by the coded video data buffer 425 where it may be combined into a common bit stream to be delivered by the transmission channel 430 to a decoder, terminal, or data storage.

Figure 5:
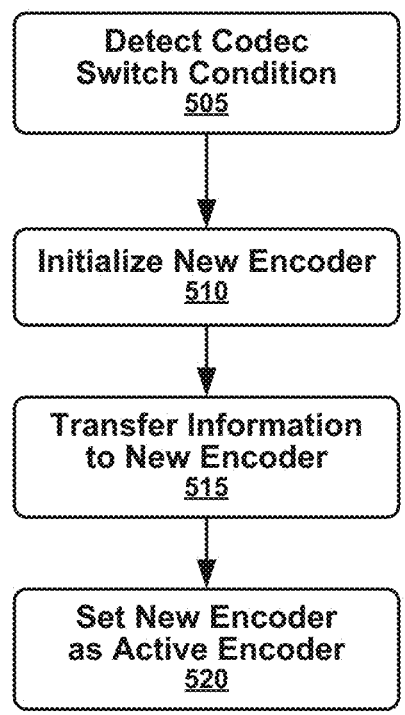
FIG. 5 is a simplified flow diagram illustrating a method for switching between encoders according to an embodiment of the present invention.

FIG. 5 is a simplified flow diagram illustrating a method 500 for switching between encoders according to an embodiment of the present invention. A similar process may be assumed for switching between two or more decoders at a receiving terminal. Initially, a first encoder may code received video data until a change in the system or encoder conditions indicates a switch in encoders (block 505). A change may be detected that indicates a switch when one or more performance measures of the system exceed a predetermined threshold. For example, any of the rate data is processed by the active encoder, the amount of power consumed by the active encoder, the available power, or the quality of the coded video being produced by the active encoder may fall below a predetermined threshold and signal an encoder change.

Upon an indication that a new encoder should be activated, the new encoder may be initialized (block 510). Initialization may include coding a throw-away frame or otherwise updating the encoder status in order to get the new encoder into a state where the next frame can be a predictively coded without delay or other interruption of the coded video.

Once the new encoder is initiated, the state information for the original encoder, including active frames stored in the reference frame cache, may then be passed or otherwise provided to the new encoder (block 515). To pass the information to the new encoder, information may be copied from the memory of the original encoder to the memory of the new encoder or information may be pulled by a controller from the original encoder, and stored in temporary storage shared by both encoders, and then accessed by the new encoder. The new encoder may then be made the active encoder and predictive coding the video data may continue (block 520). The first encoder may then be made inactive.

Figure 6:
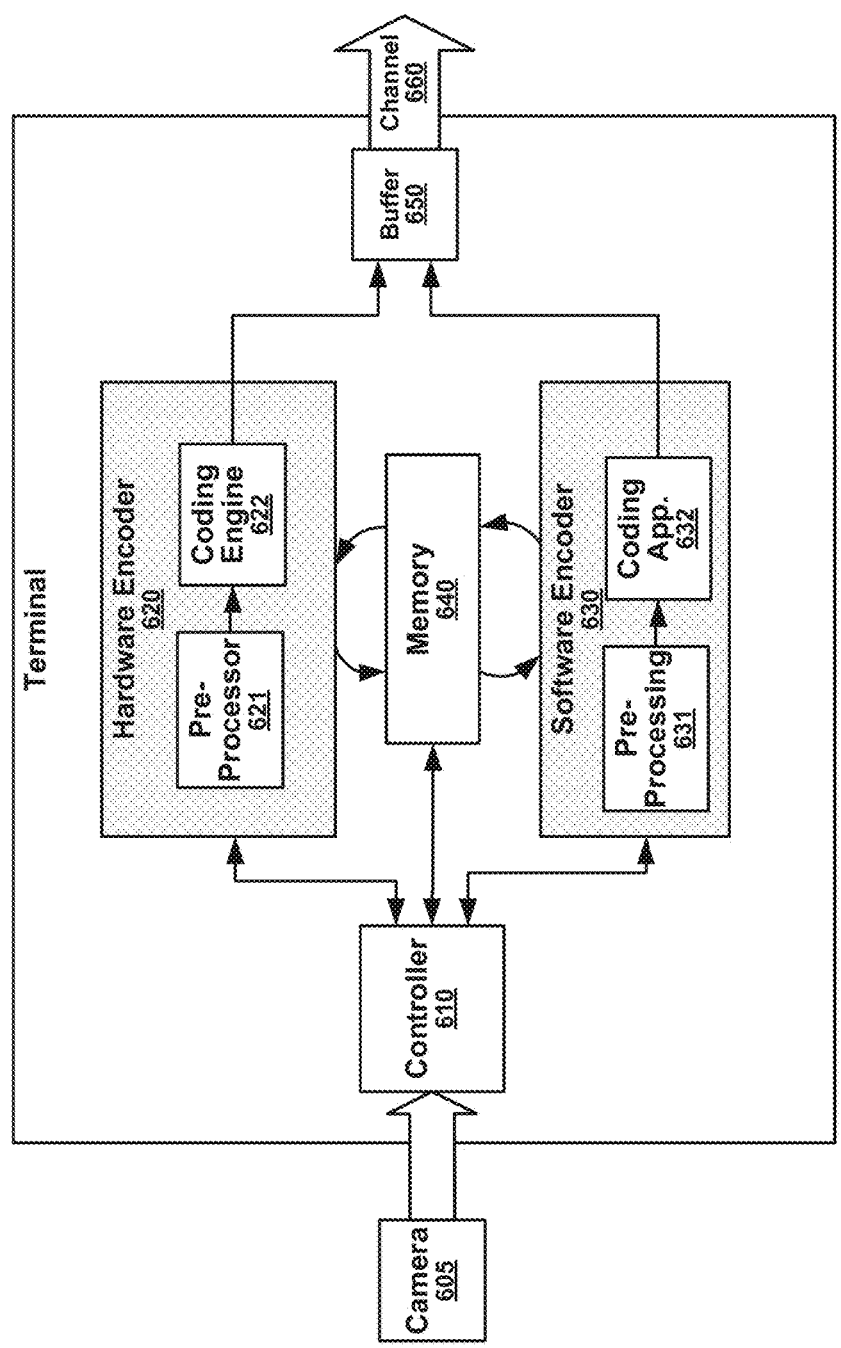
FIG. 6 is a simplified block diagram of a terminal according to an embodiment of the present invention.

FIG. 6 is a simplified block diagram of a terminal 600 according to an embodiment of the present invention. As shown in FIG. 6, the terminal 600 may include a hardware encoder 620 and a software encoder 630. The hardware encoder 620 may include a pre-processor 621 that receives source video and performs video processing operations on video components that improve efficiency of coding operations performed by the encoder 620 and a coding engine 622 that may receive the video output from the pre-processor 621 and generate compressed video.

As further shown in FIG. 6, the terminal 600 may include a software encoder 630 which may include a pre-processing module 631 that receives source video data and conditions the video data for compression and a coding application 632 that may generate compressed video from the video data prepared by the pre-processing module 631 in accordance with a coding mode.

Each of the encoders 620, 630 may have access to a memory 640 to store the reference frame cache and state information and related coding data. Memory 640 may be implemented as a general purpose external memory to store relevant state information. State information may include reference frames, frame counters for the group of pictures (GOP) or the current sequence, the GOP structure, the rate control, the current QP, etc.

The terminal 600 may additionally include a controller 610 that receives input video data from the camera 605, monitors the conditions of the encoders 620, 630, and determines which encoder will process the video data. The controller may also have access to the memory storage 640 wherein the encoders may store reference frames and other state data. The controller 610 may additionally detect conditions in the terminal 600 to determine when to switch between encoders 620, 630.

Upon determining a switch, the controller 610 may initialize the inactive encoder. During initialization, because each encoder has access to the memory 640, the information stored in the common memory may then easily be accessed by either encoder. For example, the controller 610 may pass to the second encoder a pointer to the first frame in the reference frame cache of the first encoder, and then the second encoder may access that portion of the memory 640 to begin encoding the next portion of the video data.

As shown in FIG. 6, the terminal 600 may additionally include a coded video data buffer 650 to store the coded data until it is combined into a common bit stream to be delivered by a transmission channel 660 to a decoder, terminal, or other storage.

According to an embodiment, each encoder may have its own memory storage and have access to a shared memory storage. Then information to facilitate the transition between encoders, including information required to initialize the new encoder, may be stored and accessible from the shared storage.

Figure 7:
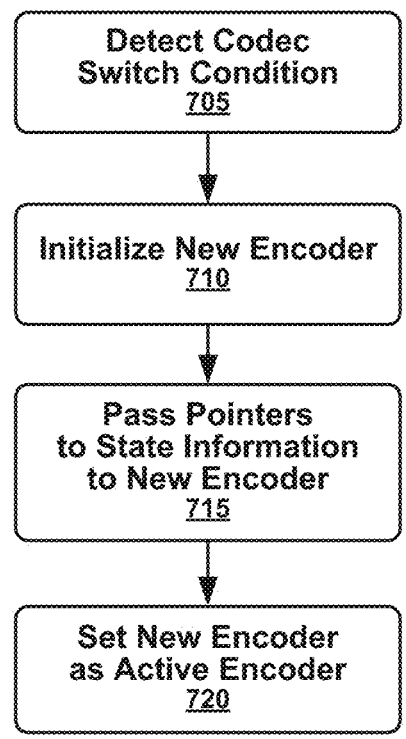
FIG. 7 is a simplified flow diagram illustrating a method for switching between encoders according to an embodiment of the present invention.

FIG. 7 is a simplified flow diagram illustrating a method 700 for switching between encoders according to an embodiment of the present invention. A similar process may be assumed for switching between two or more decoders at a receiving terminal. Initially, a first encoder may code received video data until a change in the system or encoder or data conditions indicates a switch in encoders (block 705). A change may be detected that indicates a switch when one or more performance measures of the system exceeds a predetermined threshold.

Upon an indication that a new encoder should be activated, the new encoder may be initialized (block 710). Once the new encoder is initiated, pointers to the relevant state information in shared memory, including active frames stored in the reference frame cache, may then be passed or otherwise provided to the new encoder (block 715). The relevant pointers may be provided by a controller, stored in a predefined location of the common memory, or otherwise shared between encoders. The new encoder may then be made the active encoder and predictive coding the video data may continue (block 720). The first encoder may then be made inactive.

Figure 8:
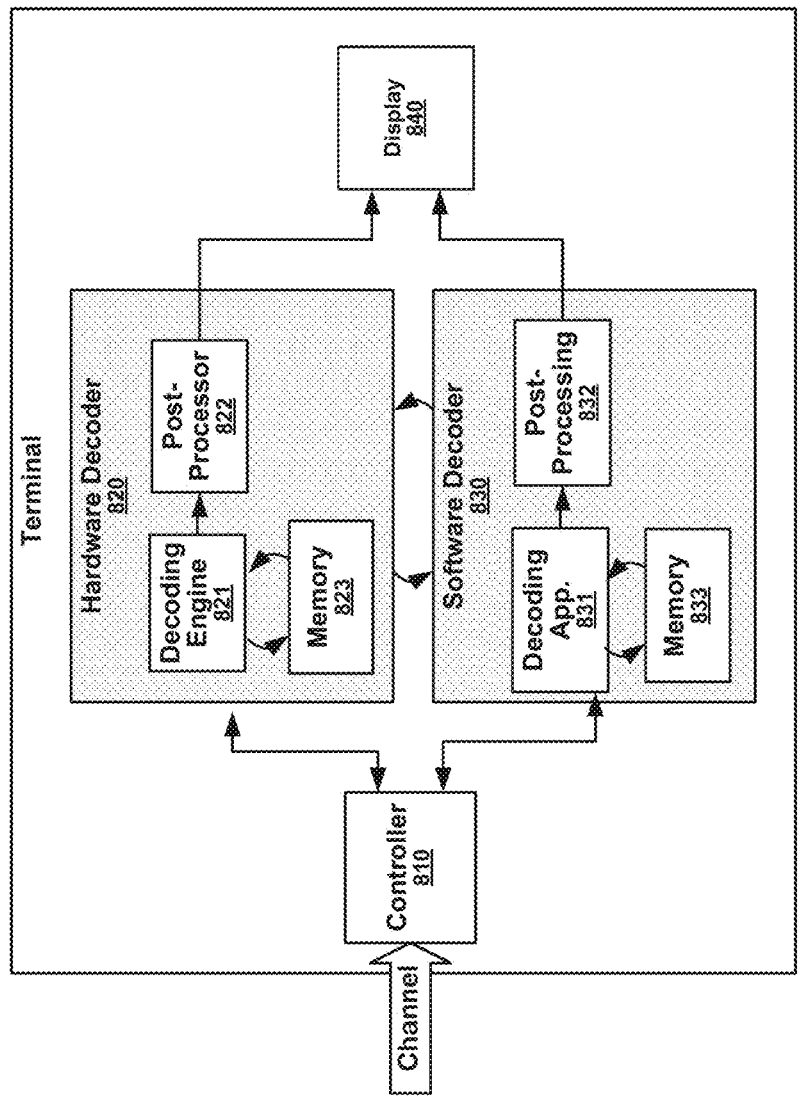
FIG. 8 is a simplified block diagram of a terminal according to an embodiment of the present invention.

FIG. 8 is a simplified block diagram of a terminal 800 according to an embodiment of the present invention. As previously noted, a receiving terminal 800 may include multiple decoders. As shown in FIG. 8, the terminal 800 may include a hardware decoder 820 and a software decoder 830.

A hardware decoder 820 may include a decoding engine 821 that receives coded video data and generates reconstructed frames in accordance with a decoding mode by reversing the processes implemented by a coding engine at the transmitting device to recover the original source video data. The hardware decoder 820 may additionally include a memory 823 to store the reference frame cache for the decoder 820 including reconstructed frame data that may represent sources of prediction for later-received frames and to store state information and related data. The decoder may also include a post-processor 822 that prepares the video data for display on a display device 840. This may include further filtering, de-interlacing, or scaling the received video.

As shown in FIG. 8, a software decoder 830 may include a decoding application 831 that receives coded video data and reconstructs the video frames in accordance with a decoding mode by reversing the procedures executed by a coding application at the transmitting device to recover the source video data. The software decoder 830 may additionally include a memory 833 to store the reference frames for the decoder and state information and related coding data. The software decoder 830 also may include a post-processing module 832 that prepares the video data for display.

The terminal 800 may additionally include a controller 810 that receives compressed video data from a channel, monitors the conditions of the decoders 820, 830, and determines which decoder will process the video data. The controller 810 may also have access to the memory storage 823, 833 where the respective decoder 820, 830 stores reference frames and other state data. The controller decision to switch from a first decoder to a second decoder may be based on a notification that the transmitting terminal has switched encoders received from the channel, changes in decoder performance, power consumption and available power, codec features available in the second decoder and not the first decoder, available bandwidth and the bandwidth required by each codec, the quality of the video being produced by the encoder or decoder, or any other performance measure that would indicate a switch is desirable.

Upon detecting a condition that would warrant switching decoders, the second decoder may be initialized. In order for the terminal 800 to continue coding the frame sequence without interruption, the second decoder may have to decode a simple throw-away frame in order to get to a state where the next frame can be predictively decoded.

Figure 9:
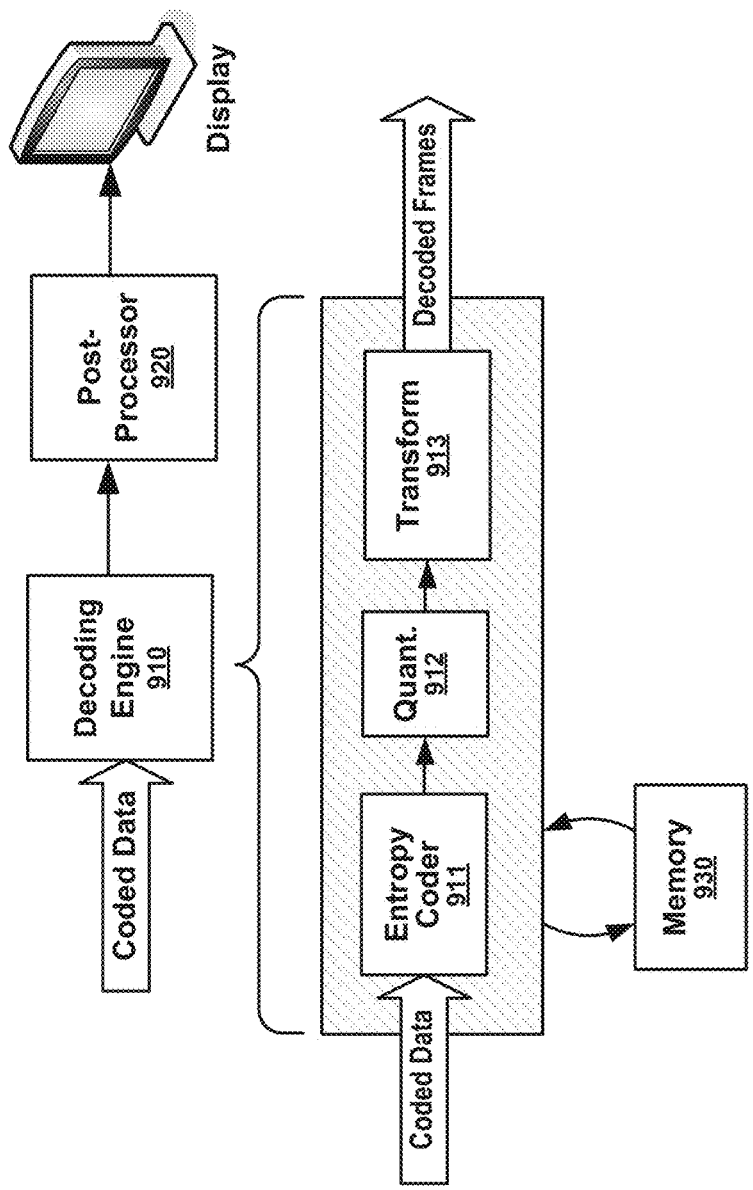
FIG. 9 is a simplified block diagram of a hardware decoder according to an embodiment of the present invention.

FIG. 9 is a simplified block diagram of a hardware decoder 900 according to an embodiment of the present invention. As shown in FIG. 9, the decoder 900 may include a decoding engine 910 to recover decompressed and reconstructed video, a post-processor 920 to prepare the video data for display, and a memory 930 to store reference frames and other decoder state information.

The decoding engine 910 may receive compressed video data and decompress the received data in accordance with a decoding mode. The decoding engine 910 may include an entropy decoder 911, a quantization unit 912, and a transform unit 913. The entropy decoder 911 may decode the coded frames by run-value or run-length or similar coding for decompression to recover the truncated transform coefficients for each coded frame. The quantization unit 912 may multiply the transform coefficients by a quantization parameter to recover coefficient values. The transform unit 913 may convert the array of coefficients to frame or pixel block data, for example, by a discrete cosine transform (DCT) process or wavelet process.

Figure 10:
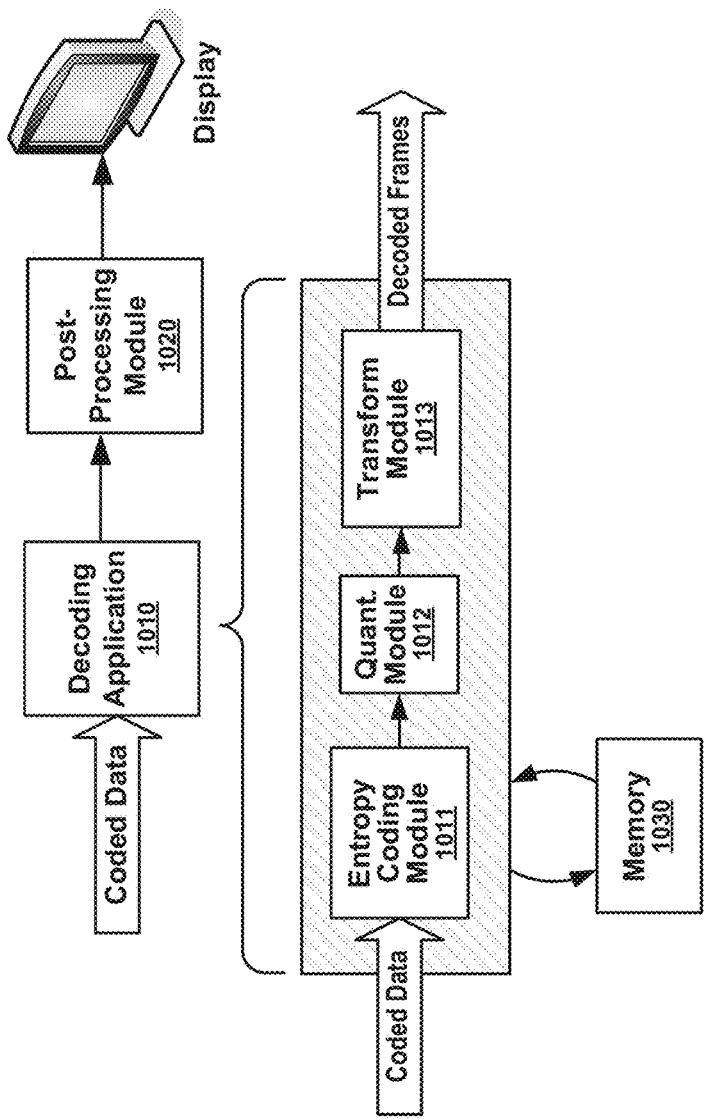
FIG. 10 is a simplified block diagram of a software decoder according to an embodiment of the present invention.

FIG. 10 is a simplified block diagram of a software decoder 1000 according to an embodiment of the present invention. As shown in FIG. 10, the decoder 1000 may include a decoding application 1010 to recover decompressed and reconstructed video, a post-processing module 1020 to prepare the video data for display, and a memory 1030 to store reference frames and other decoder state information.

The decoding application 1010 may receive compressed video data and decompress the received data in accordance with a decoding mode. The decoding application 1010 may access an entropy decoding module 1011, a quantization module 1012, and a transform module 1013. The entropy decoding module 1011 may decode the coded frames by run-value or run-length or similar coding for decompression to recover the truncated transform coefficients for each coded frame. The quantization module 1012 may multiply the transform coefficients by a quantization parameter to recover coefficient values. The transform module 1013 may convert the array of coefficients to frame or pixel block data.

Figure 11:
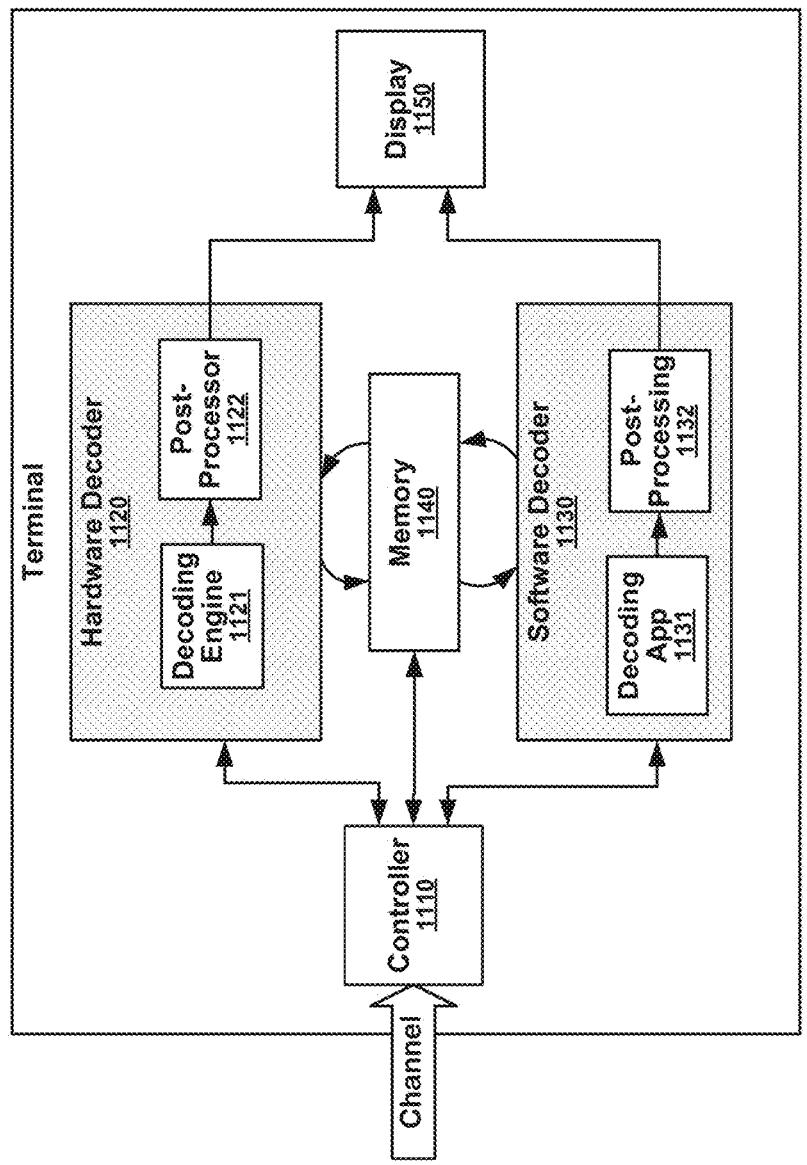
FIG. 11 is a simplified block diagram of a terminal according to an embodiment of the present invention.

FIG. 11 is a simplified block diagram of a terminal 1100 according to an embodiment of the present invention. As shown in FIG. 11, the terminal 1100 may include a hardware decoder 1120 and a software decoder 1130.

A hardware decoder 1120 may include a decoding engine 1121 that receives coded video data and generates reconstructed frames to recover the source video data and a post-processor 1122 that prepares the video data for display on a display device 1150. A software decoder 1130 may include a decoding application 1131 that receives coded video data and reconstructs the video frames and a post-processing module 1132 that prepares the video data for display.

Each of the decoders 1120, 1130 may have access to a memory 1140 to store the reference frames, state information, and related coding data. Memory 1140 may be implemented as a general purpose external memory to store relevant state information. State information may include reference frames, frame counters for the group of pictures (GOP) or the current sequence, the GOP structure, the rate control, the current QP, etc. The information stored in the common memory 1140 may then easily be accessed by either decoder. For example, the controller 1110 may pass to the second decoder a pointer to the first frame in the reference frame cache of the first decoder, and then the second decoder may access that portion of the common general purpose memory to begin decoding the next frame in the video sequence.

The terminal 1100 may additionally include a controller 1110 that receives compressed video data from a channel, monitors the conditions of the decoders 1120, 1130, and determines which decoder will process the video data. The controller 1110 may also have access to the memory storage 1140 where the decoders 1120, 1130 store reference frames and other state data. The controller decision to switch from a first decoder to a second decoder may be based on a notification that the transmitting terminal has switched encoders received from the channel, changes in decoder performance, power consumption and available power, codec features available in the second decoder and not the first decoder, available bandwidth and the bandwidth required by each codec, the quality of the video being produced by the decoder, or any other performance measure that would indicate a switch is desirable.

Upon detecting a condition that would warrant switching decoders, the second decoder may be initialized. In order for the terminal 1100 to continue coding the frame sequence without interruption, the second decoder may have to decode a simple throw-away frame in order to get to a state where the next frame can be predictively decoded.

According to an embodiment, each decoder may have its own memory storage and also have access to a shared memory storage. Then information to facilitate the transition between decoders, including information required to initialize the new decoder may be stored and accessible from the shared storage.

Figure 12:
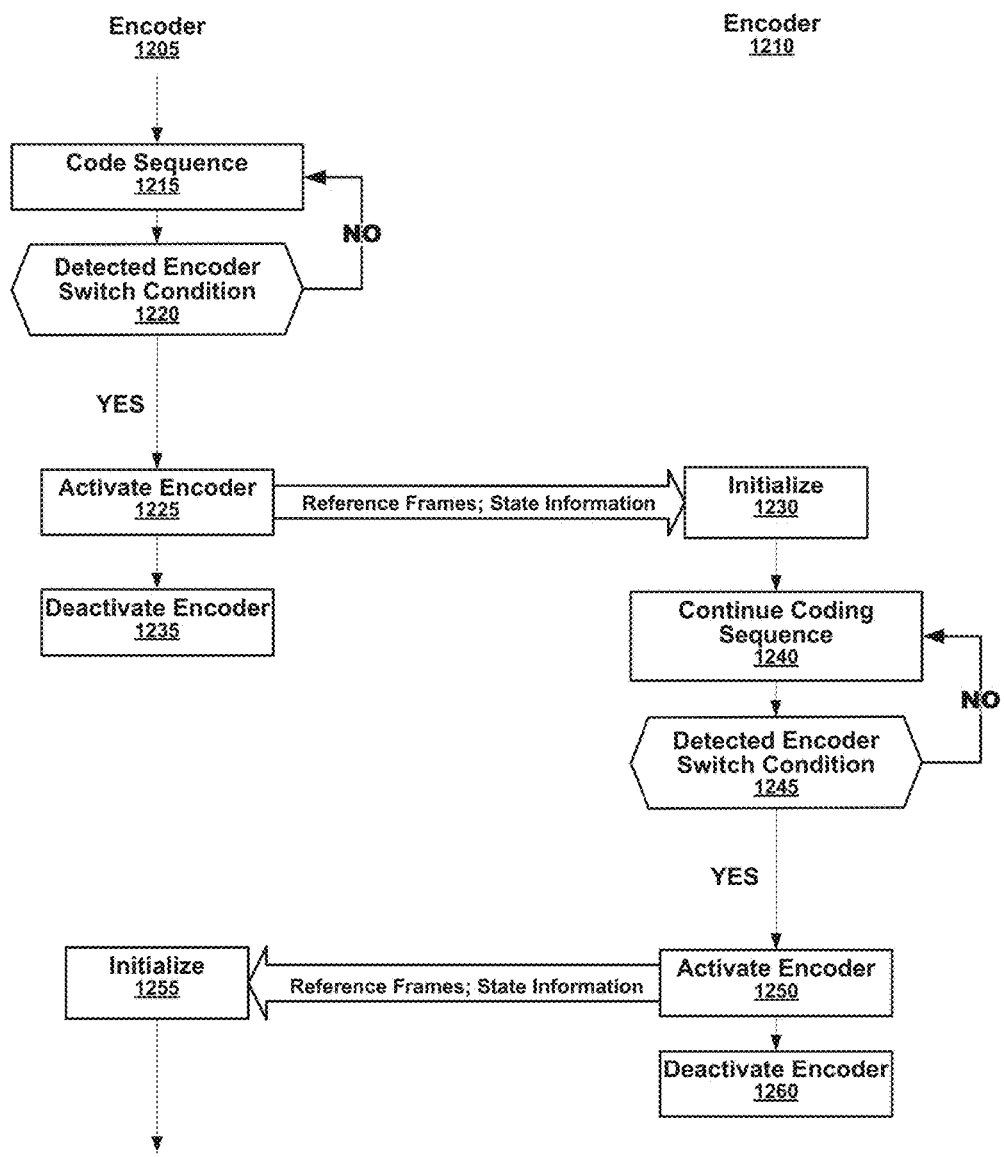
FIG. 12 is a simplified flow diagram illustrating a method for coding a video sequence with two encoders according to an embodiment of the present invention.

FIG. 12 is a simplified flow diagram illustrating an exemplary method 1200 for coding a video sequence with two encoders according to an embodiment of the present invention. A similar process may be assumed for switching between two or more decoders.

Preliminarily, a first encoder 1205 may begin coding a sequence of video frames (block 1215). The sequence may be encoded according to any known coding mode. The first encoder may be initialized as the first encoder by default, or may be selected by a controller as the best encoder to initially code the video sequence. The controller may monitor the system resources, encoder resources, or other performance measures to determine whether an encoder switch is appropriate (block 1220). For example, the bandwidth of the encoding system, the bandwidth of the first encoder 1205, or the complexity of the received data may be determinative. Upon detecting a change in system or encoder or data conditions, the controller may determine that a second encoder 1210 is better capable of encoding the remaining uncoded portions of the video sequence. The first encoder 1205 may continue encoding the video sequence until the second encoder 1210 is ready to continue coding the sequence.

As part of the initialization process of the second encoder 1210, the state information for the first encoder 1205, including active frames stored in the reference frame cache may then be passed or otherwise provided to the second encoder 1210 (block 1225). To pass the information between encoders, information may be copied from the memory of the first encoder 1205 to the memory of the second encoder 1210, information may be pulled by the controller from the first encoder 1205 and stored in temporary storage accessible by the second encoder 1210, or the controller may update the pointers in the second encoder 1210 to point to the location of the information in a shared general purpose memory. Once the second encoder 1210 is initialized, the first encoder 1205 may then become inactive (block 1235). In some instances, the first encoder 1205 may shut down or otherwise enter an idle state.

Upon a notification that the second encoder 1210 is to be an active encoder, the second encoder 1210 may be initialized (block 1230). Initialization may include coding a simple throw-away frame in order to get Encoder B to a state where the next frame can be a predictively coded frame. The state information and reference frames from the first encoder 1205 may be utilized to initialize and prepare the second encoder 1210 to code the video sequence.

Each frame in the video sequence may be encoded at the second encoder 1210 according to any known coding methods (block 1240). The controller may monitor the system resources, encoder resources, or other performance measures to determine whether an encoder switch is appropriate (block 1245). Upon detecting a change in system or encoder or data conditions, the controller may determine that the first encoder 1205 or another encoder (not shown) is better capable of encoding the remaining uncoded portions of the video sequence. The second encoder 1210 may continue encoding the video sequence until the first encoder 1205 is ready to continue coding the sequence. The first encoder 1205 may then be initialized and the state information passed between the encoders (blocks 1250, 1255). Once the first encoder 1205 is initialized, the second encoder 1210 may then become inactive (block 1260). The terminal may continue switching between encoders as needed.

Figure 13:
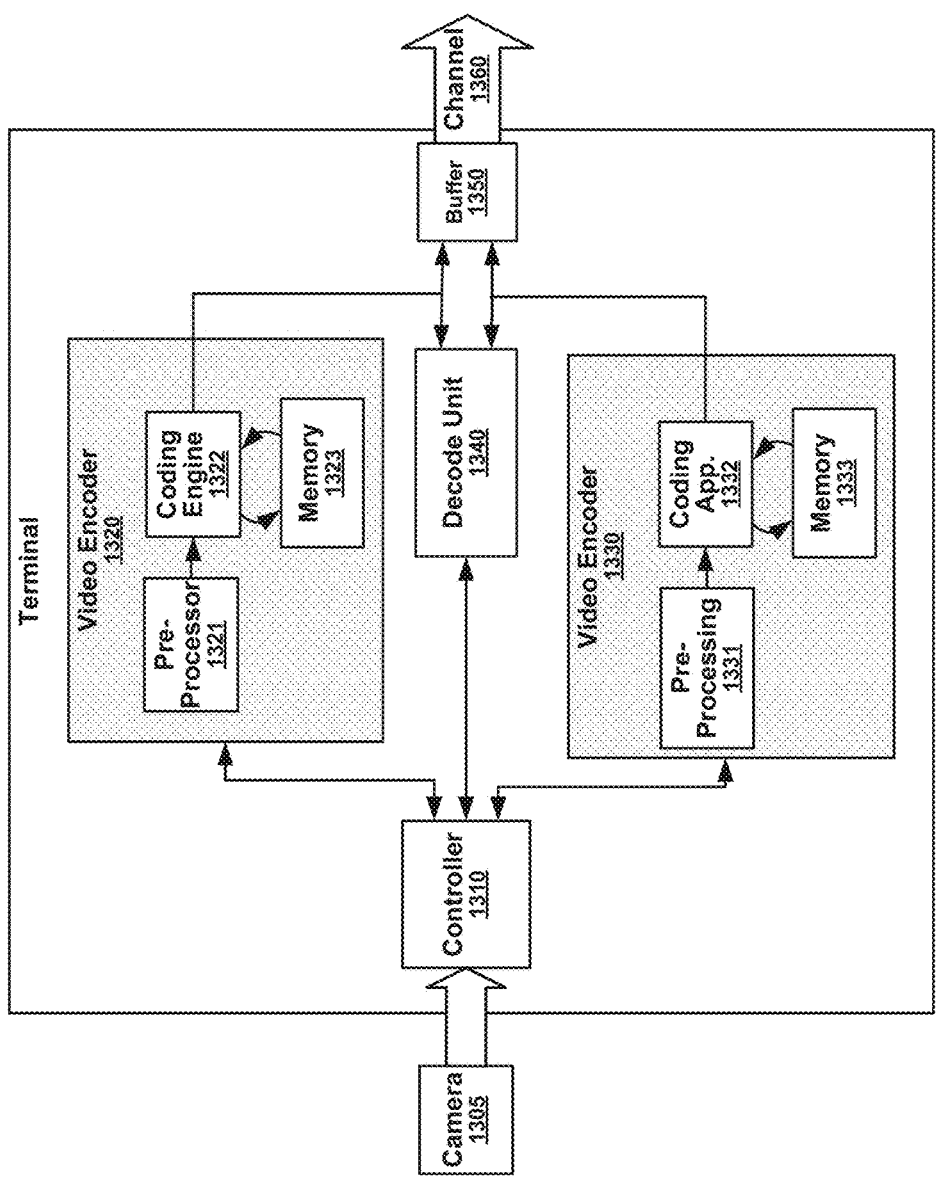
FIG. 13 is a simplified block diagram of a terminal according to an embodiment of the present invention.

FIG. 13 is a simplified block diagram of a terminal 1300 according to an embodiment of the present invention. As shown in FIG. 13, the terminal 1300 may include a first encoder 1320 and a second encoder 1330.

A first encoder 1320 may include a pre-processor 1321 that may receive source video and prepares the video data for coding, a coding engine 1322 that may receive the video output from the pre-processor 1321 and generate compressed video, and a memory 1323 to store the reference frame, state information, and related data. A second encoder 1330 may similarly include a pre-processing module 1331 that receives source video data and prepares the video data for coding, a coding application 1332 that may generate compressed video, and a memory 1333 to store reconstructed frame data and other encoder related or state information.

The terminal 1300 may additionally include a controller 1310 that receives input video data from the camera 1305, monitors the conditions of the encoders 1320, 1330, and determines which encoder will process the video data. The controller may also have access to the memory storage 1323, 1333 of each encoder 1320, 1330 wherein the respective encoder may store reference frames and other state data. The controller 1310 may additionally detect conditions in the terminal 1300 to determine when to switch between encoders 1320, 1330. Upon detecting a condition that would warrant switching encoders, the new encoder may be initialized and state information passed from the currently active encoder to the new encoder in order to seamlessly transfer the processing of video data from between encoders.

If the controller 1310 does not have access to the memory storage 1323, 1333 of the respective encoders 1320, 1330 wherein the encoders store reference frames and other state data, or cannot otherwise access the state information directly from the encoder, the state information necessary to switch between encoders may be retrieved from one or more decode units. Then the controller 1310 may recover the current state information and reference frames of the first encoder from a respective decode unit and pass the information to the second encoder.

As shown in FIG. 13, the terminal 1300 may additionally include a shared decode unit 1340 to parse the coded video data for each encoder 1320, 1330 to recover the source video data and other encoder state information. Recovering the video data may include decompressing the frames of a coded video sequence by inverting coding operations performed by the coding engine 1322 or coding application 1332 and reconstructing the coded video data to recover the sequence of video data.

A shared decode unit 1340 may code every coded frame output from each encoder 1320, 1330; only those frames that will be used as reference frames or long term reference frames; or only those frames necessary to update the new encoder upon detection of a condition that would warrant an encoder switch. The controller 1310 may determine which frames the decode unit 1340 decodes.

As shown in FIG. 13, the terminal 1300 may additionally include a coded video data buffer 1350 to store the coded data until it is combined into a common bit stream to be delivered by a transmission channel 1360 to a decoder, terminal, or other storage. A decode unit 1340 may be implemented separately from each encoder as shown or the controller may have access to the decode units implemented within each encoder.

According to an embodiment, each encoder may have its own decode unit or decode module and also have access to a shared decode unit. Then information to facilitate the transition between encoders, including reference frames required to initialize the new encoder may be accessible from the shared decode unit.

Although the terminals have been illustrated as comprising both a hardware encoder and a software encoder, it should be understood that the encoders may be implemented in any combination, for example as two software encoders or two hardware encoders. Additionally, more than two encoders or decoders may be implemented in a terminal.

As discussed above, FIGS. 2, 6, 8, 11, and 13 illustrate functional block diagrams of terminals. In implementation, the terminals may be embodied as hardware systems, in which case, the illustrated blocks may correspond to circuit sub-systems within encoder systems. Alternatively, the encoders may be embodied as software systems, in which case, the blocks illustrated may correspond to program modules within encoder software programs. In yet another embodiment, the encoders may be hybrid systems involving both hardware circuit systems and software programs. Moreover, not all of the functional blocks described herein need be provided or need be provided as separate units. For example, although FIG. 2 illustrates the components of an exemplary encoder, such as the pre-processor 221 and coding engine 222, as separate units, in one or more embodiments, some or all of them may be integrated. Such implementation details are immaterial to the operation of the present invention unless otherwise noted above.

Some embodiments may be implemented, for example, using a non-transitory computer-readable storage medium or article which may store an instruction or a set of instructions that, if executed by a processor, may cause the processor to perform a method in accordance with the disclosed embodiments. The exemplary methods and computer program instructions may be embodied on a non-transitory machine readable storage medium. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

While the invention has been described in detail above with reference to some embodiments, variations within the scope and spirit of the invention will be apparent to those of ordinary skill in the art. Thus, the invention should be considered as limited only by the scope of the appended claims.

We claim:

1. A system for encoding video data comprising:
a plurality of encoders each to code source video data and each having different operational characteristics; and
a controller configured to:
monitor at least one performance measure of the system in which the plurality of encoders are operating;
identify a desired operating point of the system;
when a second encoder is a closer match to the desired operating point than a first encoder, initialize the second encoder, wherein initializing the second encoder comprises:
passing state information from the first encoder to the second encoder; and
once the second encoder has been initialized, transferring coding operations from the first encoder to the second encoder and deactivating the first encoder.

2. The system of claim 1, wherein the state information includes at least one reference frame from a reference frame cache.

3. The system of claim 1, wherein the state information includes a frame count.

4. The system of claim 1, wherein the state information includes a structure for a current Group of Pictures (GOP).

5. The system of claim 1, wherein the state information includes a control bitrate.

6. The system of claim 1, wherein the state information includes a quantization parameter.

7. The system of claim 1, wherein the desired operating point represents a power consumption rate.

8. The system of claim 1, wherein the desired operating point represents a coding quality of coded video.

9. The system of claim 1, wherein the desired operating point represents a bandwidth of coded video.

10. The system of claim 1, wherein the desired operating point represents a type of codec.

11. The system of claim 1, wherein the desired operating point represents an encode frame rate.

12. The system of claim 1, wherein the desired operating point represents a decode power consumption at a receiver.

13. The system of claim 1, wherein the transferring the state information comprises a controller transferring the state information from a memory unit for the first encoder to a memory unit for the second encoder to update the state information.

14. The system of claim 1, wherein the initializing the second encoder further comprises coding at the second encoder a duplicate frame as previously coded by the first encoder, the duplicate frame to be discarded.

15. The system of claim 1, wherein said first encoder is a hardware encoder.

16. The system of claim 1, wherein said second encoder is a software encoder.

17. The system of claim 1, further comprising a shared memory unit to store the state information, the shared memory unit accessible by both the first and the second encoder.

18. The system of claim 17, wherein said passing includes identifying a location of the current state information within the shared memory unit and providing that location to the second encoder.

19. The system of claim 17, wherein said passing includes updating the state information at a predetermined location in the shared memory unit.

20. The system of claim 1, further comprising a decode unit to decode coded frames of the video data, the decode unit accessible by both the first and the second encoder.

21. The system of claim 20, wherein said passing includes transmitting a current reference frame from the decode unit to the second encoder.

22. The system of claim 20, wherein said passing includes decoding a current frame at the decode unit and passing the decoded frame to the second encoder.

23. A system for decoding compressed video data comprising:
a plurality of decoders, wherein a first decoder is implemented to decode compressed video data;
a controller configured to:
monitor at least one operational characteristic of the system in which the plurality of the decoders are operating;
identify a desired operating point of the system;
when a second decoder is a closer match to the desired operating point than a first decoder, initialize the second decoder wherein initializing the second decoder comprises:
passing state information from the first decoder to the second decoder; and
once the second decoder has been initialized, transferring the decoding operations from the first decoder to the second decoder and deactivating the first decoder.

24. The system of claim 20, wherein said initializing the second decoder further comprises coding at the second encoder a duplicate frame as previously coded by the first encoder, the duplicate frame to be discarded.

25. The system of claim 20, further comprising a memory unit to store the state information, the memory unit accessible by both the first and the second decoder.

26. A method for encoding video data comprising:
coding source video data at a first encoder;
monitoring at least one operational characteristic of the system in which the first encoder is operating;
identifying a desired operating point of the system;
when a second encoder is a closer match to the desired operating point than the first encoder, initializing the second encoder, wherein said initializing comprises:
passing state information from the first encoder to the second encoder; and
once the second encoder has been initialized, transferring the coding operations from the first encoder to the second encoder and deactivating the first encoder.

27. The method of claim 26, wherein the state information includes at least one reference frame from a reference frame cache.

28. The method of claim 26, wherein said initializing further comprises coding at the second encoder a duplicate frame as previously coded by the first encoder, the duplicate frame to be discarded.

29. The method of claim 26, further comprising storing said state information in a shared memory unit accessible by both the first and the second encoder.

30. The method of claim 29, wherein said passing includes identifying a location of the current state information within the shared memory unit and providing that location to the second encoder.

31. The method of claim 29, wherein said passing includes updating the state information at a predetermined location in the shared memory unit.

32. The method of claim 26, wherein said passing further comprises decoding a frame at a decode unit accessible by both the first and the second encoder and transmitting the decoded frame to the second encoder.

33. A non-transitory computer readable medium storing program instructions that, when executed by a processing device, cause the device to:
code source video data at a first encoder;
monitor at least one operational characteristic of a system in which the first encoder is operating;
identify a desired operating point of the system;
when a second encoder is a closer match to the desired operating point than the first encoder, initialize the second encoder, wherein said initializing comprises:
passing state information from the first encoder to the second encoder; and
once the second encoder has been initialized, transferring the coding operations from the first encoder to the second encoder and deactivating the first encoder.

* * * * *